United States Patent [19]
Drouet

[11] Patent Number: 5,993,061
[45] Date of Patent: Nov. 30, 1999

[54] DEVICE FOR MEASURING THE TEMPERATURE OF A HOT WALL

[75] Inventor: Pierre Drouet, Brignais, France

[73] Assignee: Elf Antar France, France

[21] Appl. No.: 08/683,470

[22] Filed: Jul. 18, 1996

[30] Foreign Application Priority Data

Jul. 18, 1995 [FR] France .................................. 95 08679

[51] Int. Cl.⁶ .............................. G01K 1/14; G01K 7/00
[52] U.S. Cl. .......................... 374/208; 374/147; 374/163
[58] Field of Search .................................. 374/147, 208, 374/120, 163

[56] References Cited

U.S. PATENT DOCUMENTS

| 2,048,680 | 7/1936 | Bird et al. | 136/232 |
|---|---|---|---|
| 3,143,439 | 8/1964 | Hansen | 374/208 |
| 3,151,484 | 10/1964 | Feehan et al. | 374/147 |
| 3,263,952 | 8/1966 | Fisher | 374/208 |
| 3,901,080 | 8/1975 | Hilborn | 374/147 |
| 3,907,606 | 9/1975 | Chang | 374/208 |
| 4,164,433 | 8/1979 | Granahan et al. | 136/229 |
| 4,411,537 | 10/1983 | Grimm | 374/185 |
| 4,971,452 | 11/1990 | Finney | 374/147 |
| 5,141,335 | 8/1992 | Wannamaker et al. | 374/179 |
| 5,172,979 | 12/1992 | Barkley et al. | 374/147 |
| 5,382,093 | 1/1995 | Dutcher | 374/208 |
| 5,454,641 | 10/1995 | Parker et al. | 374/147 |

FOREIGN PATENT DOCUMENTS

| 2 699 669 | 6/1994 | France . | |
|---|---|---|---|
| 126229 | 1/1928 | Switzerland . | |
| 1040351 | 9/1983 | U.S.S.R. | 374/147 |
| 2062860 | 5/1981 | United Kingdom | 374/147 |

OTHER PUBLICATIONS

Navy Technical Disclosure Bulletin, vol. 4, No. 10, Oct. 1979, pp. 51–58. H. Erakat, "Temperature Sensors".

*Primary Examiner*—Diego F.F. Gutierrez
*Attorney, Agent, or Firm*—Bacon & Thomas

[57] ABSTRACT

A device for measuring the temperature of a hot wall comprising a measuring element (2) housed in a bearing piece (6) and held in contact with the hot wall (1) using clamping means (12) fitted on a support bridge (11). The invention finds its application especially in metallurgical, petroleum-based, chemical and nuclear plants, cement works, glass works and thermal steam-production power plants.

4 Claims, 2 Drawing Sheets

DEVICE FOR MEASURING THE TEMPERATURE OF A HOT WALL

TECHNICAL FIELD

The present invention relates to a device for measuring the temperature of a wall, especially in a corrosive atmosphere.

It finds its application in the crude-oil processing industry, the chemical and petrochemical industries, glass works, cement works, coking plants and industries in which steam generators are used, and the nuclear industry.

STATE OF THE PRIOR ART

The safe running of equipment used in various industries to heat liquid or gaseous fluids at high temperature requires accurate knowledge of the temperature of the outer wall of this equipment. This is the case, for example, for the tubes fitted in furnaces of crude-oil processing units, in which hydrocarbons flow. The temperature of the outer surface of these tubes must not exceed the limit value which the metal alloy with which they are manufactured can withstand without the risk of being destroyed.

Devices for measuring the temperature of the surface of these tubes are generally in contact with the hot corrosive gases which result from the combustion of hydrocarbons or of carbon-containing products, these containing elements such as sulphur whose combustion products are particularly corrosive.

In addition, this type of equipment must operate continuously for long periods, for example 3 to 5 years, during-which maintenance work must be as short as possible.

A device for protecting measuring instruments in a hot corrosive atmosphere is described in Patent FR 2,699,669. This device includes a sheath which at least partially surrounds the measuring instrument, being separated from it by an annular space, this sheath emerging via one of its ends in the atmosphere in which the measurement is performed while its other end is connected to a means for supplying a gas which is inert with respect to the measuring instrument, so as to be able to cause the inert gas to flow between the sheath and the said measuring instrument.

When this device is used for measuring the temperature of a wall by means of a thermocouple, for example a tube skin temperature in a furnace for heating a liquid or gaseous fluid, the flow of inert gas must sweep over the thermocouple in order to prevent the corrosive gases of the furnace atmosphere from coming into contact with it.

This influx of gas modifies the temperature of the thermocouple and consequently falsifies the measurement of the temperature of the wall. In addition, this device is complicated to fit because of the supply of inert gas, which is generally not available near the point of measurement.

For plants operating continuously, the consumption of an inert gas may prove to be very expensive. This consumption, directly proportional to the number of points of measurement, results in high operating costs and thereby makes the device unsuitable for many measurements.

In addition, the sheath in which the thermocouple is housed must be welded to the wall whose temperature it is desired to measure, excluding the possibility of unfitting it, and requires lengthy intervention times in order to replace the thermocouple.

With this device, the thermocouple is subjected to thermal radiation from the heating elements which surround it, for example the radiation from the flames produced by hydrocarbon burners in furnaces. This radiation is the cause of significant errors in the value of the measurement obtained with this device. It therefore can be used only for measuring temperatures of walls which are not exposed to thermal radiation. This limits its applications considerably.

DESCRIPTION OF THE INVENTION

The object of the present invention is precisely to remedy these drawbacks and especially to provide an accurate and reliable device for measuring the temperature of a hot wall, especially in a corrosive atmosphere.

The device of the invention minimizes the effects of the thermal radiation to which it is subjected and makes it easy for the temperature-measuring element to be rapidly replaced.

To install it requires no supply of an inert gas to the point of measurement and its use requires no consumption of inert gas.

The temperature-measuring element is well protected from the corrosive action of the ambient medium, which gives it a very long life.

To this end, the present invention provides a device for measuring the temperature of a hot wall, which includes a measuring element equipped with electrical connection means partially protected by a sheath, characterized in that it furthermore includes, welded at that end of the sheath which faces the measuring element, a bearing piece provided, on the one hand on one of its faces, with a cavity in which the measuring element is placed and, on the other hand, with a channel emerging in the said cavity in order to ensure passage of the unprotected part of the electrical connection means, a support bridge which is equipped with clamping means and is welded to the hot wall so as to form a housing for the bearing piece, the dimensions of the said bearing piece and of the said support bridge being such that these two elements, once fitted, are separated by a free space and, moreover, in that the measuring element is held in contact with the hot wall by the bearing piece on which the clamping means of the support bridge act.

According to another characteristic, the present invention provides a measuring device, characterized in that the clamping means include at least one setscrew.

According to another characteristic, the present invention provides a measuring device, characterized in that the face of the bearing piece provided with the cavity, in which the measuring element is placed, is machined in order to be in partial contact with the hot wall.

According to another characteristic, the present invention proposes a measuring device, characterized in that the protective sheath of the electrical connection means and the bearing piece are protected by a covering based on at least one ceramic product.

BRIEF DESCRIPTION OF THE DRAWINGS

The invention will be more easily understood with the help of the following description of one embodiment given by way of example, with reference to the appended drawings, in which.

DETAILED DESCRIPTION OF THE INVENTION

In general, the device of the invention is used to measure the temperature of a hot wall, especially in a corrosive atmosphere, such as the surface temperature of furnace tubes used to heat liquid or gaseous fluids.

Figure 1:
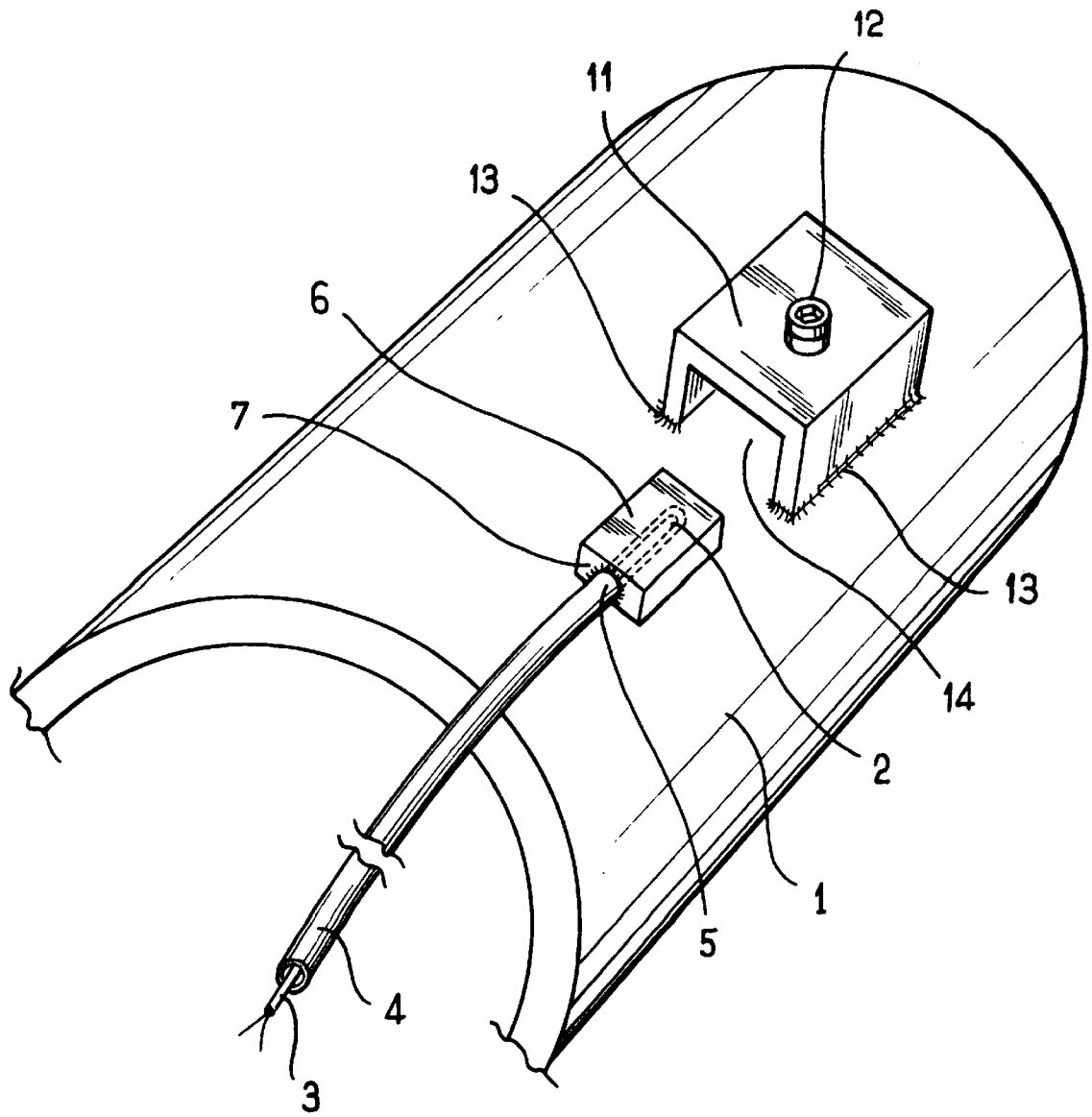
FIG. 1 diagrammatically represents the main constituent elements of the temperature-measuring device, these elements being unassembled.
Figure 2:
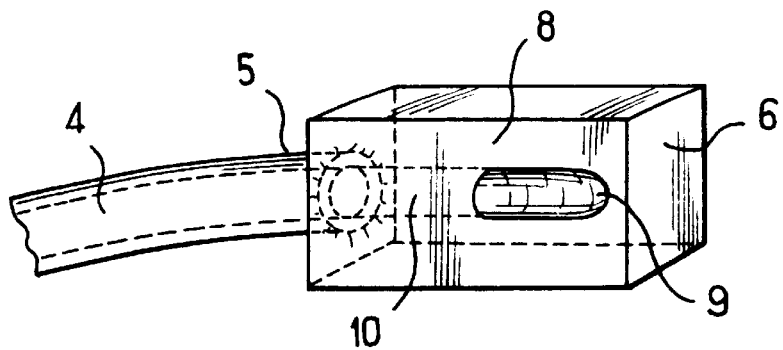
FIG. 2 diagrammatically represents the bearing piece welded to the protective sheath of the means for electrical connection of the measuring element.

According to the embodiment shown in FIG. 1, and partially in FIG. 2, the device includes:

an element 2 for measuring the temperature of the wall 1;

means 3 for the electrical connection of the temperature-measuring element 2;

a protective sheath 4 for the electrical connection means 3, the end 5 of which faces the temperature-measuring element 2;

a bearing piece 6;

a weld 7 of the end 5 of the sheath 4 to the bearing piece 6;

a cavity 9 emerging on the face 8 of the bearing piece 6;

a channel 10 for passage of the electrical connection means 3;

a support bridge 11;

clamping means 12; and a housing 14 for the bearing piece 6.

The device also includes, not shown in the figures, electronic means for processing the electrical signal emitted by the temperature-measuring element 2, to which means it is connected.

The measuring element 2 may be a thermocouple, or a temperature-measuring probe, of the resistance type or the semiconductor type, or any other type of probe. In the case of the thermocouple, this is formed by the weld of the ends of two wires made of different metals, these wires being electrically insulated except at their welded ends.

These wires, forming the electrical connection means 3, are protected by a sheath 4, except in the vicinity of the thermocouple.

The end 5 of the sheath 4 is welded to the bearing piece 6 so that the unprotected part of the electrical connection means 3 penetrates the channel 10, and so that the thermocouple 2 lies in the cavity 9 which emerges on the face 8 of the bearing piece 6, it being possible for the thermocouple 2 to be advantageously locked in position in the passage channel 10 by means of a locking screw.

The bridge 11 is welded to the wall 1 by means of the welds 13. The free space between the branches of the bridge 11 and the wall 1 forms a housing 14 for the bearing piece 6.

The latter is fitted in its housing so that the face 8, equipped with the cavity 9, is in contact with the wall 1 whose temperature it is desired to measure. Using this arrangement, the thermocouple 2 placed in the cavity 9 is in contact with the wall 1.

Figure 3A:
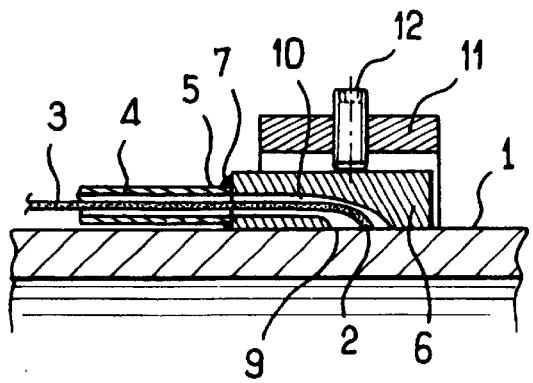
FIGS. 3a and 3b represent, in longitudinal and transverse sections, the main elements of the temperature-measuring device, these elements being assembled.
Figure 3B:
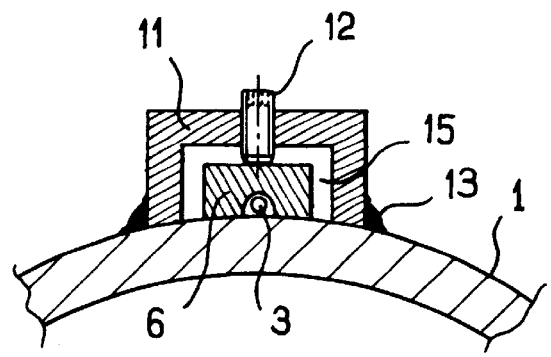

The dimensions of the bearing piece 6 and the bridge 11 are such that, with the bearing piece 6 in place in the housing 14, a space 15 remains between these two elements, as shown in FIG. 3.

Using the clamping means 12, the bearing piece 6 is held in place in the housing 14 and the thermocouple 2 is pressed against the wall 1. By way of example of clamping means, mention may be made of a setscrew whose end presses on the bottom of a housing made in the bearing piece 6. Mention may also be made of a key forcibly fitted into the space 15.

By virtue of the presence of the space 15 between the bearing piece 6 and the bridge 11, the heating of the bridge 11 resulting from the thermal radiation from the surrounding heating elements is not transmitted to the bearing piece 6, except minimally by the clamping means 12. Thus, the thermocouple 2 is effectively protected from the surrounding thermal radiation. Since the signal which it delivers is not influenced by this radiation, it is representative of the temperature of the wall 1.

The face 8 of the bearing piece 6 may be machined in order for it to match the shape of the wall 1.

The thermocouple 2 in its housing is well protected from the effect of the corrosive gases of the ambient medium.

The fitting and unfitting of the bearing piece 6 welded to the protective sheath 4 and of the thermocouple are easy to accomplish in a very short time. They do not require the work of a trained welder on site.

Consequently, the device of the invention is inexpensive to install and maintain.

The support bridge 11 is advantageously made from the same metal as the equipment whose temperature it is desired to measure.

The shapes of the bridge 11 and the bearing piece 6 which are shown in the figures are given by way of example. The person skilled in the art will easily be able to determine different shapes well suited to the shape of the wall whose temperature it is desired to measure.

Figure 4:
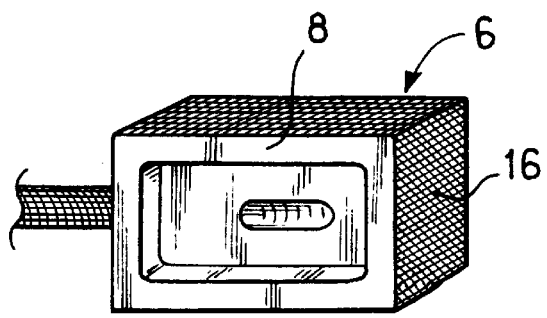
FIG. 4 represents a particular embodiment of the bearing piece.

According to another embodiment, shown in FIG. 4, the face 8 of the bearing piece 6 is machined so as to reduce its area of contact with the wall 1, this having the effect of decreasing the influence of the bearing piece 6 on the temperature of the wall 1 in the region of the measuring element and thus of improving the accuracy of the measurement.

According to a final characteristic of the invention also shown in FIG. 4, the protective sheath 4 of the electrical connection means and the bearing piece 6 are covered with a ceramic material 16 in order to increase the corrosion resistance of these elements.

I claim:

1. Apparatus comprising a hot wall and a device for measuring the temperature of the hot wall comprising a temperature measuring element equipped with electrical connection means partially protected by a sheath having an end which faces the temperature measuring element, a bearing piece welded at that end of the sheath which faces the temperature measuring element, said bearing piece provided, on one of its faces, with a cavity in which the temperature measuring element is placed and with a channel emerging in said cavity in order to ensure passage of the unprotected part of the electrical connection means, a support bridge which is equipped with clamping means and is welded to the hot wall so as to form a housing for the bearing piece, the dimensions of said bearing piece and of said support bridge being such that these two elements, once fitted, are separated by a free space and wherein the temperature measuring element is held in contact with the hot wall by the bearing piece on which the clamping means of the support bridge act.

2. Apparatus according to claim 1, wherein the clamping means include at least one setscrew.

3. Apparatus according to claim 1, wherein the face of the bearing piece provided with the cavity, in which the temperature measuring element is placed, is machined in order to be in partial contact with the wall.

4. Apparatus according to claim 1, wherein the protective sheath of the electrical connection means and the bearing piece are protected by a covering based on at least one ceramic product.

* * * * *